US006492758B1

(12) United States Patent
Gianni et al.

(10) Patent No.: US 6,492,758 B1
(45) Date of Patent: Dec. 10, 2002

(54) POLYPHASE TRANSVERSE FLUX MOTOR (75) Inventors: Christian John Wade Gianni, Auckland (NZ); John H. Boyd, Jr., Holland, MI (US)

(73) Assignee: Fisher & Paykel Limited, Auckland (NZ)

( * ) Notice: Subject to any disclaimer, the term of this patent is extended or adjusted under 35 U.S.C. 154(b) by 0 days.

(21) Appl. No.: 09/704,123

(22) Filed: Nov. 1, 2000

Related U.S. Application Data (60) Provisional application No. 60/184,965, filed on Feb. 25, 2000.

(51) Int. Cl.$^7$ .......................... H02K 19/02; H02K 21/14
(52) U.S. Cl. ...................................... 310/257; 310/216
(58) Field of Search ............................... 310/254, 49 R, 310/216, 257, 263, 218, 168, 259, 186, 185; 29/596–598

(56) References Cited

U.S. PATENT DOCUMENTS

| | | | |
|---|---|---|---|
| 5,117,142 A | 5/1992 | von Zweygbergk |
| 5,633,551 A | 5/1997 | Weh |
| 5,854,521 A | 12/1998 | Nolle |

Primary Examiner—Tran Nguyen
(74) Attorney, Agent, or Firm—Trexler, Bushnell, Giangiorgi, Blackstone & Marr, Ltd.

(57) ABSTRACT

A tranverse flux motor having multiple stator phase windings which are electronically commutated to produce a rotating flux to drive a permanent magnet rotor located externally of the stator. The stator is formed by two complementary facing pieces each carrying half the stator poles, the latter preferably being of claw pole configuration. The stator windings are sandwiched between the stator pieces and wound about cores which magnetically couple the stator pieces. Preferably the number of motor phases (P) is selected from the series 2, 3, . . . , N, the number of windings per phase (W) is selected from the series 1, 2, . . . , M, the number of poles per winding (PW) is selected from the series 2, 4, . . . , L, and the number of stator poles (SP) is equal to the product P*WP*PW and the number of rotor poles is SP±W.

11 Claims, 5 Drawing Sheets

POLYPHASE TRANSVERSE FLUX MOTOR

This application claims the domestic priority under 35 U.S.C. §120 of United States Provisional Application Ser. No. 60/184,965 filed on Feb. 25, 2000.

TECHNICAL FIELD

This invention relates to polyphase transverse flux dc motors and in particular, but not solely, motors of the "inside out" type where the rotor rotates externally of the stator.

PRIOR ART

The use of term "polyphase" in relation to a dc motor means a motor with a plurality of windings, or a plurality of sets of windings, which when excited sequentially from a dc source produce a rotating flux. Commutation of the motor phases is normally achieved using electronic switching devices in a bridge arrangement with the switching sequences controlled by a micro-processor.

The advantages of transverse flux machines are well known. A transverse flux machine is capable of producing power densities several times greater than conventional electrical machines. This arises from the geometry of transverse flux motors which enables a larger number of poles while maintaining the same magnetomagnetic force (MMF) per pole as would be achieved in a conventional machine design.

Transverse flux machines have in the past been difficult to implement because standard core lamination techniques do not easily permit the three dimensional. magnetic flux flow required in transverse flux machines. This difficulty is being overcome by the use of sintered powdered iron cores. These may be formed by a compression moulding technique.

Most transverse flux machine configurations disclosed hitherto are single phase machines. An example is disclosed in U.S. Pat. No. 5,773,910 (Lange). Proposals for polyphase machines usually involve complex geometries which lead to difficulties in manufacture. For example U.S. Pat. No. 5,117,142 (Von Zueygbergk), U.S. Pat. No. 5,633,551 (Weh) and U.S. Pat. No. 5,854,521 (Nolle).

It is therefore an object of the present invention to provide a polyphase transverse flux DC motor which is simple to manufacture.

SUMMARY OF THE INVENTION

Accordingly in one aspect the invention consists in a polyphase transverse flux dc motor comprising:

a rotor having alternating magnetic pole polarities at the periphery; and a stator mounted co-axially with said rotor so as to provide at least one air gap there between, said stator including:

a first stator piece having a plurality of circumferentially disposed and spaced apart claw poles projecting in an axial direction, a second stator piece complementary to said first stator piece and mounted co-axially in facing relationship with said first stator piece such that there is an axial spacing there between and oriented about the common axis such that the claw poles of the second pole piece circumferentially alternate with the claw poles of the first pole piece;

a plurality of magnetically permeable bridging cores disposed about the stator axis proximate to said claw poles and located between said first and second stator pieces to provide magnetic flux paths there between, at least one said stator piece being provided with regions of magnetic high reluctance between the sites of said bridging cores, and stator windings disposed about each bridging core each of which when supplied with an exciting current produce flux flow through those stator claw poles in the first and second pole pieces which are proximate to the corresponding bridging core thereby producing flux in said air gap adjacent such claw poles, each winding or a selected set of windings constituting the windings for one of a plurality of motor phases which in use are electronically commutated to produce a flux in said air gap which rotates about the stator axis.

In a further aspect the invention consists in a polyphase transverse flux dc motor comprising:

a rotor having a plurality of permanent magnets circumferentially disposed and separated by magnetically permeable material to provide alternating magnetic pole polarities at the periphery, said magnets being magnetised in the circumferential direction; and a stator mounted co-axially with said rotor so as to provide at least one air gap therebetween, said stator including:

a first stator piece having a plurality of circumferentially disposed and spaced apart claw poles projecting in an axial direction, a second stator piece complementary to said first stator piece and mounted co-axially in facing relationship with said first stator piece such that there is an axial spacing therebetween and oriented about the common axis such that the claw poles of the second pole piece circumferentially alternate with the claw poles of the first pole piece, a plurality of magnetically permeable bridging cores disposed about the stator axis proximate to said claw poles and located between said first and second stator pieces to provide magnetic flux paths therebetween, at least one said stator piece being provided with regions of magnetic high reluctance between the sites of said bridging cores, and stator windings disposed about each bridging core each of which when supplied with an exciting current produce flux flow through those stator claw poles in the first and second pole pieces which are proximate to the corresponding bridging core thereby producing flux in said at least one air gap adjacent to such claw poles, each winding or a selected set of windings constituting the windings for one of a plurality of motor phases which in use are electronically commutated to produce a flux in said air gap which rotates about the stator axis.

In a further aspect the invention consists in a method of making a stator for a polyphase transverse flux dc motor, comprising the steps of:

forming a first stator piece having a plurality of circumferentially disposed and spaced apart claw poles projecting in an axial direction, forming a second stator piece similar and complementary to said first stator piece, providing a plurality of magnetically permeable bridging cores to be symmetrically disposed about the stator axis proximate to said claw poles between said first and second stator pieces to provide magnetic flux paths therebetween, providing regions of high magnetic reluctance between the sites of said bridging cores in either or both of the first or second stator pieces, placing stator windings about each bridging core, assembling the first and second stator pieces co-axially in facing relationship with each other and spaced axially apart by said bridging cores with said second stator piece oriented about the common axis such that the claw poles of said second pole piece circumferentially alternate with the claw poles of said first pole piece;

each said winding or a selected set of said windings constituting the windings for one of a plurality of motor phases such that in use when supplied with an exciting current produce flux flow through those stator claw poles in the first and second pole pieces which are proximate to the corresponding bridging core.

In yet a further aspect the invention consists in a polyphase transverse flux motor including a rotor having a plurality of circumferentially disposed permanent magnets separated by segments of high permeability material to form rotor poles, a stator mounted co-axially with said rotor so as to provide at least one air gap therebetween, said stator having a plurality of circumferentially disposed and spaced apart poles, at least one stator winding per phase disposed such that when supplied with an exciting current produce flux flow through stator poles which are proximate thereto to produce a flux in said air gap adjacent to said poles, said windings in use being electronically commutated to produce a flux in said air gap which rotates about the stator axis, the improvement defined by the relationship wherein the number of motor phases (P) is selected from the series 2, 3, . . . , N, the number of windings per phase (W) is selected from the series 1, 2 . . . M, the number of poles associated with each winding (PW) is selected from the series 2, 4, . . . 1, and the number of stator poles (SP) is equal to the product P*WP*PW and the number of rotor poles is SP±W.

BRIEF DESCRIPTION OF DRAWINGS

FIG. 2 shows an exploded view of a stator for the motor in FIG. 1 with FIG. 2A showing a first stator piece, FIG. 2B showing a second complementary stator piece and FIG. 2C showing four of six stator windings.

DESCRIPTION OF THE PREFERRED EMBODIMENTS OF THE INVENTION

Figure 1:
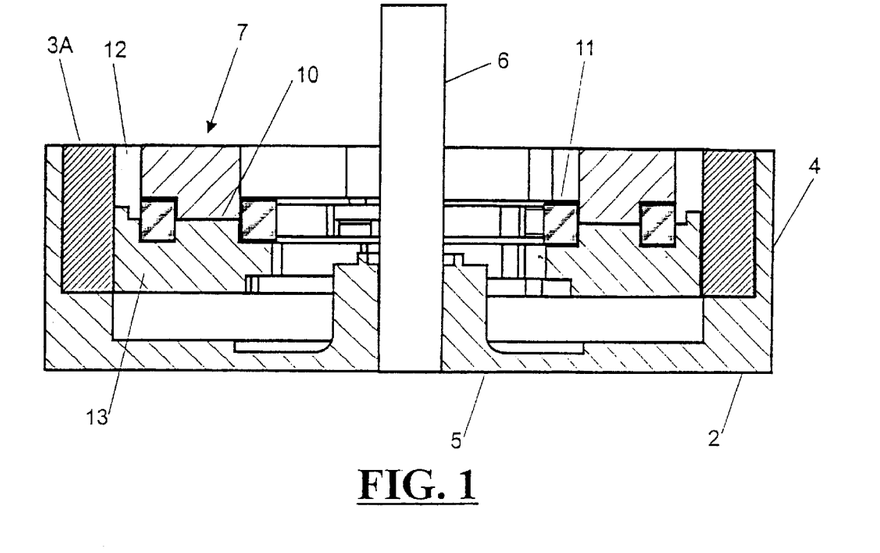
FIG. 1 shows a diagrammatic diametrical cross-section through a motor according to the present invention.

In one preferred form of the invention the rotor 2 is located externally of the stator 7 as indicated in FIG. 1. As is mentioned later a variety of known rotor configurations may be used. Rotor 2 as shown comprises an annular ring of axially oriented magnetic material pieces 3A interspersed with similarly configured permanent magnets 3B (not shown in FIG. 1). The permanent magnets 3B are magnetised in the circumferential direction with successive magnets being magnetised with opposite polarities. The annular ring of magnetic components is supported by a cylindrical non-magnetic backing wall 4, preferably formed from a plastics material integrally with a base 5 and hub which carries the rotor shaft 6. The shaft is supported by bearings mounted either conventionally in a housing supporting the stator or within the appliance which the motor is to power. An example of the latter type of mounting in a clothes washing machine is disclosed in U.S. Pat. No. 5,150,589.

Figure 6:
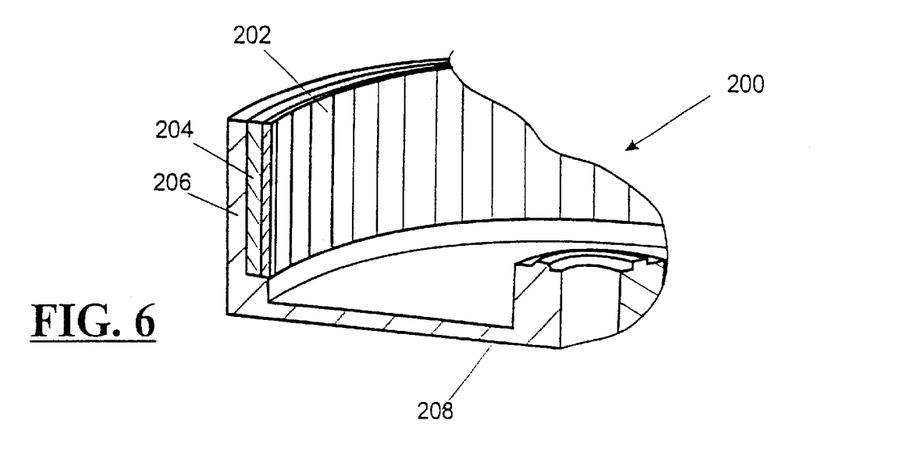
FIG. 6 shows an alternative rotor configuration.

An alternative rotor configuration is shown in FIG. 6. In this construction the rotor 200 comprises an annular ring of magnetisable and magnetically permeable material, rotating exteriorly of the stator. In one embodiment of this configuration a number of circumferentially orientated magnets 202 are disposed around the internal periphery of the rotor. The permanent magnets 202 are magnetised in the radial direction, alternating in polarity, and abut an annular soft magnetic material return path 204 to complete the magnetic circuit. The annular ring of magnetic components is supported by a cylindrical backing wall 206, preferably formed from a plastics material integrally with a base 208 and hub which carries the rotor shaft.

The motor stator 7 (see also FIG. 2) is fabricated by two complementary facing pieces 8 and 9 formed from material of high magnetic permeability spaced axially apart by bridging cores 10, also formed of a highly permeable material. Each stator piece 8 and 9 includes a number of spaced apart and axially directed poles 12 and 13 respectively, located at the periphery. The stator poles are of the claw pole type.

Figure 2A:
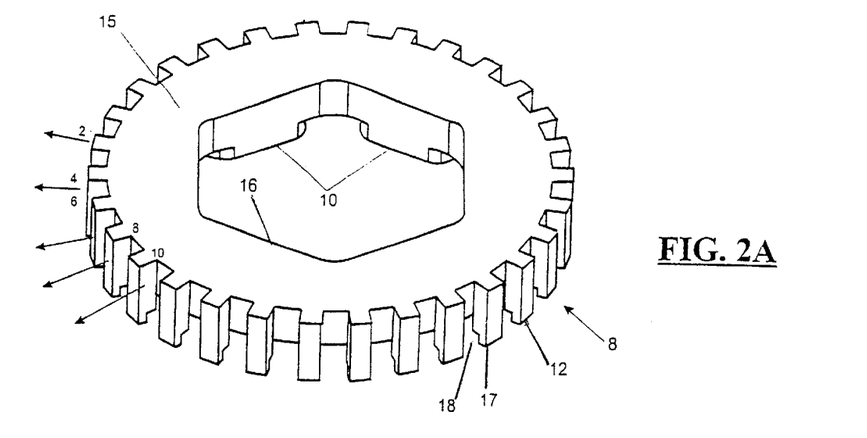

The bridging cores 10, of which there are six in the embodiment shown, are symmetrically disposed about the axis of the stator and located in proximity to the stator poles. The purpose of these cores is to allow magnetic flux to flow from one stator piece to the other. Each bridging core also conveniently forms the core for a corresponding stator winding 11.

The stator illustrated is a three "phase", 60 pole stator with two windings per phase. The two primary stator pieces 8 and 9 are, in the embodiment illustrated, similar in form and are assembled together face to face with their respective axially directed poles 12 and 13 facing the opposing stator piece with the relative rotational orientation of each stator piece being such as to allow the poles 12 of the upper piece to locate within the interspacing of the poles 13 of the lower piece. In the preferred form the interpole spacing exceeds the width of each pole and the axial length of each pole is extended such that the oppositely directed poles of the two stator pieces overlap. This can be seen in FIG. 3.

Figure 9:
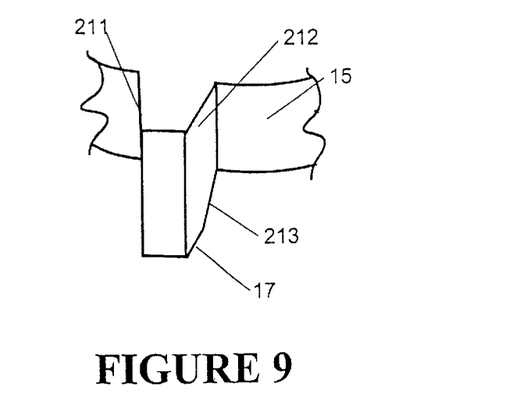
FIG. 9 is a partial view of a stator piece showing a further pole configuration.

Each stator piece can be visualised as a circular plate 15 carrying at its periphery spaced apart claw poles 12 and 13 respectively. A cavity 16 is provided centrally in each plate to conserve material and to allow the passage of the rotor shaft. Each pole is oriented axially and in the preferred embodiment has a circumferential width less than the interpole spacing. Each pole stands proud of "plate" 15 and the pole tips are rebated to form a reduced area tip 17 which has the effect of reducing leakage flux between adjacent pole tips and/or the other stator piece. Other pole configurations can be adopted to minimise flux leakage. For example, the claw poles can be tapered in one or more ways. In FIG. 9 a pole is shown tapered in two directions. First the side faces 211 and 212 may taper from the root of the pole to its outer radial face. Second inner face 213 may taper from where it joins the stator piece "plate" 15 to the tip 17. Further, in the stepped pole embodiment shown in FIG. 2 the step may be a ramped rebate instead of assuming the right angled rebate form shown.

Figure 2B:
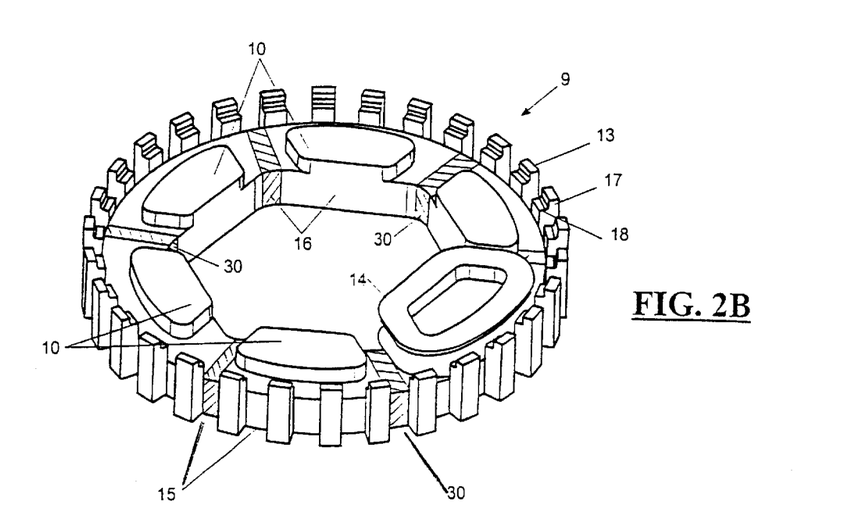
Figure 2C:
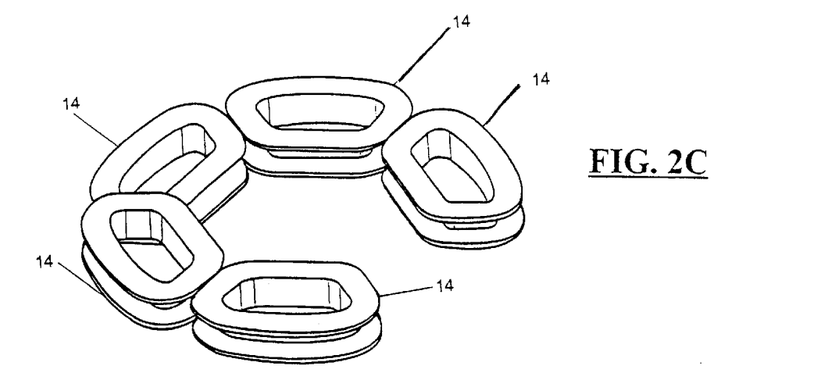

To ensure at least the bulk of the flux produced by each winding flows through the poles proximate to that winding and not through the plate material to other windings it is necessary to provide regions of high reluctance in at least one of the plates 15 between the bridging cores. Magnetically these regions appear as "slots" and in the preferred embodiment suitable slots 30 are provided in the lower stator piece plate as shown in FIG. 2B. In theory the slots 30 could be air gaps but to retain the unitary structure of each stator piece an engineering strength low permeability material is used. Preferably this is moulded into the stator piece and also forms the stator hub as shown in FIG. 9.

The stator must be formed in two pieces to allow the several internal windings to be put in place during manufacture. The two pieces must be magnetically linked to provide flux paths between the two and the bridging cores adopted to achieve this are formed by providing on the inner face of one or both stator plate 15 raised "islands" 10 which on assembly of the two pieces abut with their opposite number on the facing piece to provide a magnetic core about which a winding may be placed. The bridging cores may be formed integrally with one of the stator pieces. Alternatively some bridging cores can be formed integrally with one piece while the others are formed integrally with the second piece. As a further alternative "half height" bridging cores may be formed in each stator piece which during assembly of the stator are physically brought together in series to complete the magnetic circuit. This alternative construction is that shown in FIG. 2. In this embodiment the stator pieces are similar but not identical since the bridging cores 10 must align while at the same time allowing for misalignment of the poles of the respective pieces. In yet a further alternative the bridging cores may be formed separately and located with the plates 15 during assembly.

This stator geometry allows a single winding to produce flux through several poles. Each winding is separately wound on single bobbins 14 (see FIG. 2C) according to conventional winding techniques. The bobbins 14 are preferably formed from a plastics material and are shaped so as to fit about each bridging core 10.

Figure 3:
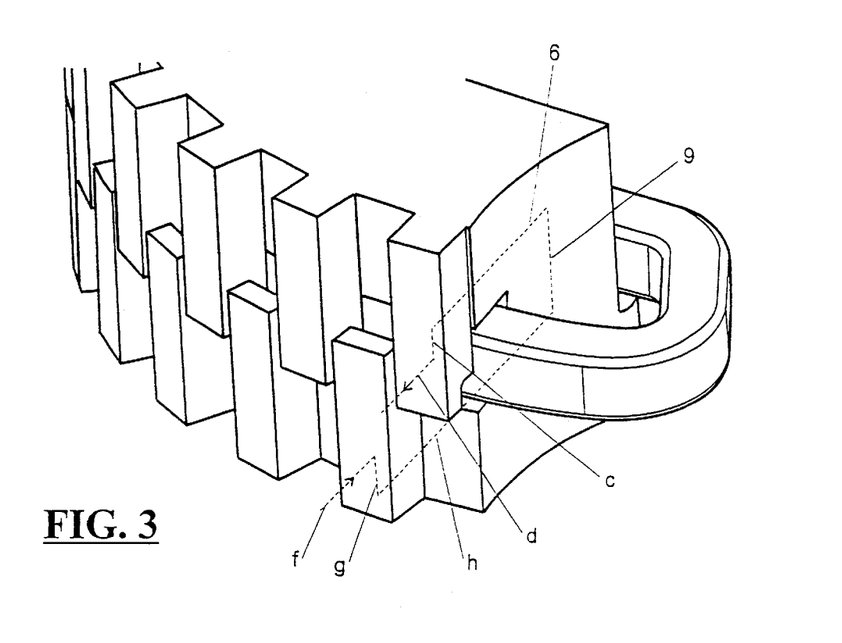
FIG. 3 shows a partial pictorial view of the periphery of the stator indicating a representative flux path produced by a single winding.
Figure 5:
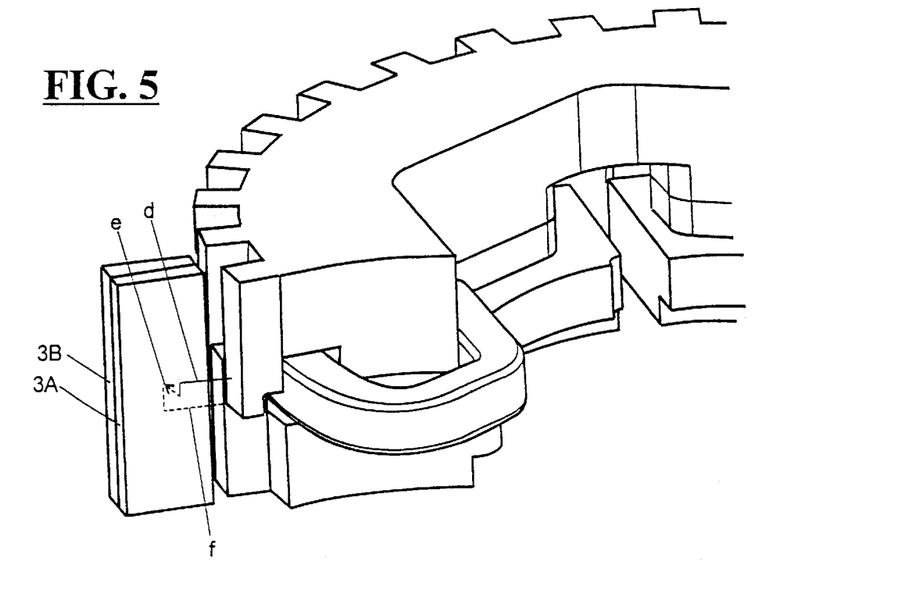
FIG. 5 shows a fragmentary view of the magnetic components of one preferred form of rotor and the flux flow therethrough.

In the three phase stator described two diametrically opposite windings are connected together in parallel or in series and on commutation are excited in series with the windings of another phase to clause flux to flow in the stator in the vicinity of the excited windings. One flux path so produced is shown in FIGS. 3 and 5. Each winding in this embodiment causes flux to flow through five poles in each stator piece. For the path shown the flux passes through the bridging cores 10 (flux segment a) into the plate of the upper stator piece (flux segment b), then into a pole of the upper piece (segment c), leaves the pole and crosses the motor air gap (segment d) radially into the physically most proximate soft magnetic material piece 3A of rotor 2 (shown in FIG. 5), passes circumferentially into and through adjacent permanent magnet 3B and into the magnetic material piece 3A on the opposite side of this magnet (segment e, visible in FIG. 5), passes through the soft magnetic material piece in an axial direction and leaves the soft magnetic material piece to cross the air gap radially (segment f) to the closest pole on the lower stator piece, travels through that pole (segment g) to the lower stator plate where it proceeds radially (segment h) to return to the bridging core 10 to complete the flux circuit.

In the case of the alternative rotor construction shown in FIG. 6 the flux path through the rotor differs somewhat. The flux leaves the pole and crosses the motor air gap (segment d, FIG. 3) radially into the physically most proximate permanent magnet (202, FIG. 6) circumferentially through the soft magnetic material return path (204, FIG. 6) and back radially through an adjacent permanent magnet to cross the air gap radially (segment f, FIG. 3) to the closest pole on the lower stator piece.

Only one flux path for two poles is shown for purposes of clarity. In reality flux flows three dimensionally through all five poles in the upper stator piece and all five poles of the lower stator piece which are excited by winding 11.

Figure 7:
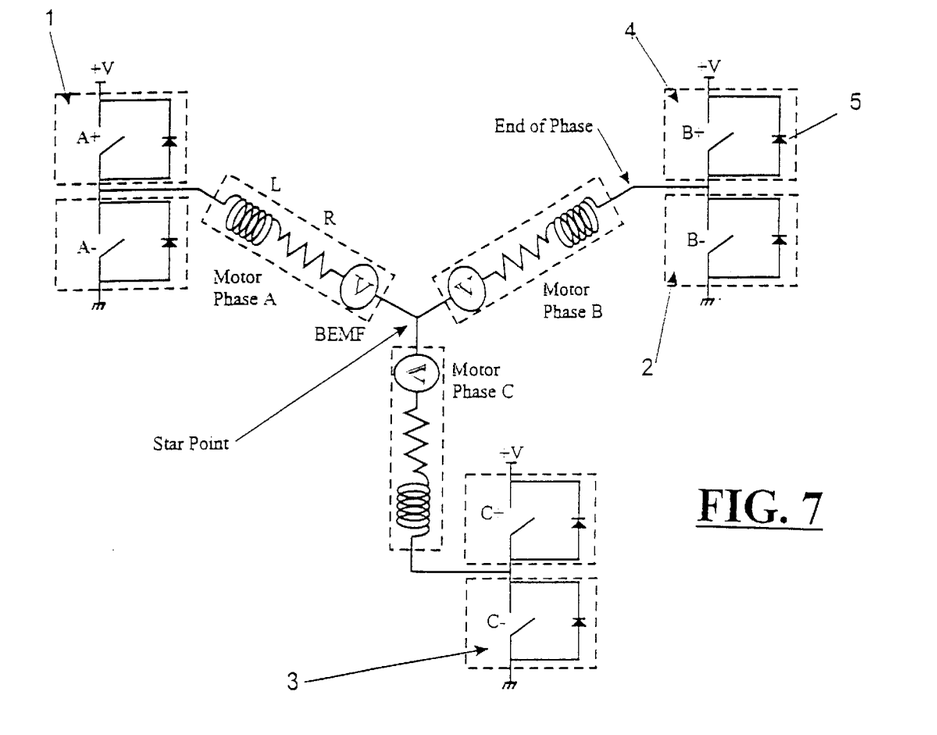
FIG. 7 shows diagrammatically a three phase commutation circuit for the motor.

In a two phase firing embodiment (refer to FIG. 7), after commutation of motor current through the windings of phase A and phase B, motor current is then commutated to flow through the phase A and phase C windings to cause the radially directed flux produced at the periphery of the stator to move around the periphery of the stator in the desired direction. The permanent magnets in rotor 2 which are alternately located between the soft magnetic material pieces 3A are attracted or repelled by the stator flux to cause the rotor to move in synchronism with the rotating stator flux. The supply of the winding current and the commutation of the windings can be carried out in a known manner using two semi-conductor switching devices per phase ("totem pole") in a bridge configuration between dc rails with the devices being switched under the control of a microprocessor (not shown) which stores sequences of switching patterns which are caused to execute in a cyclical manner to produce a flux which rotates about the stator in one direction or other as selected. Such stator winding commutation control is described in U.S. Pat. No. 4,540,921 (Boyd), U.S. Pat. No. 4,857,814 (Duncan) and WO 98/35429 (Boyd et al), particularly with reference to FIGS. 1 (which corresponds to present FIG. 7) and 2 of the latter.

The present invention provides a polyphase transverse flux dc motor having simple geometry which is relatively easy to fabricate. As opposed to some prior art proposals the stator geometry allows for a motor having a single air gap.

In a motor according to the present invention the following relationship holds:

If the number of phase P=2, 3, . . . , N, N being an integer $\geq 2$;

the number of windings per phase W=1, 2, . . . , M, M being an integer $\geq 1$;

and the number of poles per winding PW=2, 4, . . . , L, L being an even integer $\geq 2$;

then the number of stator poles SP is given by SP=P×W× PW; and the number of rotor poles RP=SP±W per phase.

It is advantageous to make the number of windings per phase even to balance the radial forces acting when the phase is excited and in some cases it is desirable for the number of poles per winding to be even when an opposed pair claw pole geometry is chosen. However, it is possible to have an odd number of poles per winding, for example 9.

When the number of windings per phase is two or more the windings may connected in either series or in parallel. However a parallel connection may have the advantage in that it will reduce the radial force dissymmetry in the presence of air gap dissymmetries.

In the embodiment illustrated and described three phases have been chosen with two windings per phase and 10 poles per winding. This results in a stator having 60 poles and the rotor to use with the stator must have either 62 or 58 poles.

Figure 4:
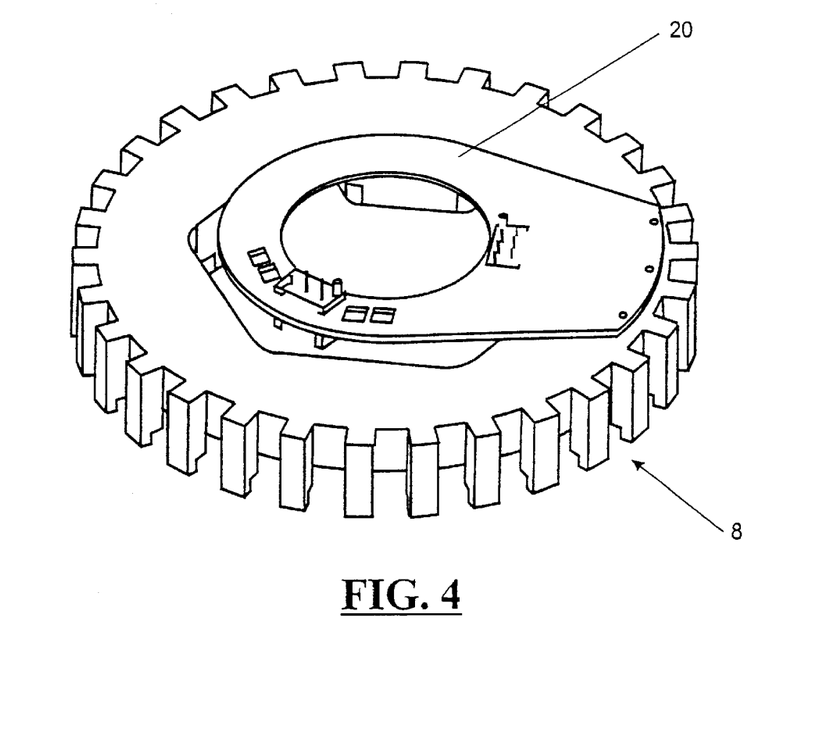
FIG. 4 shows a stator piece to which an electronics circuit board is mounted.

It is convenient for manufacturing purposes to locate the motor commutation electronics in physical association with the motor. This is shown in FIG. 4 where the electronics are located on a printed circuit board 20 which is fixed to stator piece 8.

Figure 8:
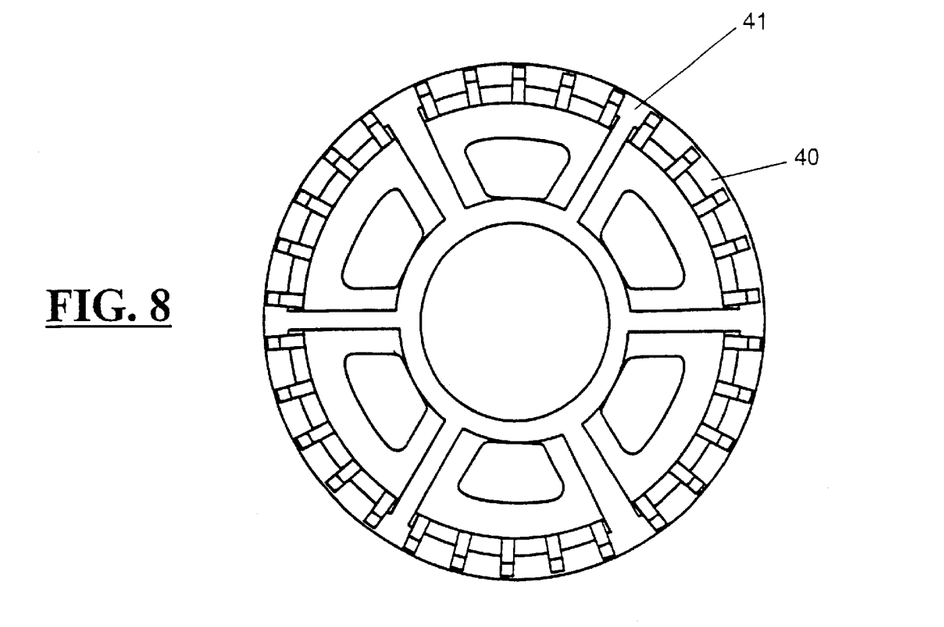
FIG. 8 shows one piece of a two piece mould for forming a stator piece of the motor.

The stator pieces can be formed by pressing a soft magnetic material powder, such as iron powder, into a mould 40 shaped for the purpose (see FIG. 8). For one of the two stator pieces a former 41 made of low permeability material is preferably used to provide the high reluctance slots 30 in the stator pieces. The former remains as an integral part of the stator piece on removal of the piece from the mould. This former can also function as a bearing retainer. Pressing the soft magnetic material powder around the former allows very accurate concentricity between the bearing and the air gap. In the preferred embodiment the other stator piece does not require slots and no former is required.

We claim:

1. A polyphase transverse flux dc motor comprising:
   a rotor having a plurality of permanent magnets circumferentially disposed and separated by magnetically permeable material to provide alternating magnetic pole polarities at the periphery, said magnets being magnetised in the circumferential direction; and
   a stator mounted co-axially with said rotor so as to provide at least one air gap therebetween, said stator including:
      a first stator piece having a plurality of circumferentially disposed and spaced apart claw poles projecting in an axial direction,
      a second stator piece complementary to said first stator piece and mounted co-axially in facing relationship with said first stator piece such that there is an axial spacing therebetween and oriented about the common axis such that the claw poles of the second stator piece circumferentially alternate with the claw poles of the first stator piece,
      a plurality of magnetically permeable bridging cores disposed about the stator axis proximate to said claw poles and located between said first and second stator pieces to provide magnetic flux paths therebetween,
      at least one said stator piece being provided with regions of magnetic high reluctance between the sites of said bridging cores, and
      stator windings disposed about each bridging core each of which when supplied with an exciting current produce flux flow through stator claw poles in the first and second stator pieces which are proximate to the corresponding bridging core thereby producing flux in said at least one air gap adjacent to said proximate claw poles, each winding or a selected set of windings constituting the windings for one of a plurality of motor phases which in use are electronically commutated to produce a flux in said air gap which rotates about the stator axis.

2. A polyphase transverse flux dc motor comprising:
   a rotor having alternating magnetic pole polarities at the periphery; and
   a stator mounted co-axially with said rotor so as to provide at least one air gap therebetween, said stator including:
      a first stator piece having a plurality of circumferentially disposed and spaced apart claw poles projecting in an axial direction,
      a second stator piece complementary to said first stator piece and mounted co-axially in facing relationship with said first stator piece such that there is an axial spacing therebetween and oriented about the common axis such that the claw poles of the second stator piece circumferentially alternate with the claw poles of the first stator piece,
      a plurality of magnetically permeable bridging cores disposed about the stator axis proximate to said claw poles and located between said first and second stator pieces to provide magnetic flux paths therebetween,
      at least one said stator piece being provided with regions of magnetic high reluctance between the sites of said bridging cores, and
      stator windings disposed about each bridging core each of which when supplied with an exciting current produce flux flow through stator claw poles in the first and second stator pieces which are proximate to the corresponding bridging core thereby producing flux in said air gap adjacent to said proximate claw poles, each winding or a selected set of windings constituting the windings for one of a plurality of motor phases which in use are electronically commutated to produce a flux in said with at least one air gap which rotates about the stator axis.

3. A polyphase transverse flux dc motor according to claim 2 wherein said rotor comprises a plurality of permanent magnets circumferentially disposed around a magnetically permeable return path, said magnetised in the radial direction.

4. A polyphase transverse flux dc motor according to claim 1 or 2 wherein said bridging cores are integrally formed as part of one stator piece.

5. A polyphase transverse flux dc motor according to claim 1 or 2 wherein some bridging cores are integrally formed as part of one stator piece while the balance are formed as part of the other stator piece.

6. A polyphase transverse flux dc motor according to claim 1 or 2 wherein complementary halves of each bridging core are integrally formed as part of each stator piece.

7. A polyphase transverse flux dc motor according to either of claim 1 or 2 wherein the spacing interval between claw poles exceeds the width of each claw pole.

8. A polyphase transverse flux dc motor according to claim 7 wherein the end portion of each claw pole of a respective stator piece extends axially into the interclaw space of the opposite stator piece.

9. A polyphase transverse flux dc motor according to either claim 1 or 2 wherein the number of motor phases (P) is P, and said P, where N is an integer $\geq 2$; the number of windings per phase (W), is W, and said W, where M is an integer $\geq 1$; the number of poles associated with each winding (PW) is PW, and said PW, where L is an even integer $\geq 2$; and the number of stator poles (SP) is SP, and said SP is given by SP=(P)×(W)×(PW) and the number of rotor poles is SP±W.

10. A method of making a stator for a polyphase transverse flux dc motor, comprising the steps of:
    forming a first stator piece having a plurality of circumferentially disposed and spaced apart claw poles projecting in an axial direction,
    forming a second stator piece similar and complementary to said first stator piece, providing a plurality of magnetically permeable bridging cores disposed about the stator axis proximate to said claw poles between said first and second stator pieces to provide magnetic flux paths therebetween,
    providing regions of high magnetic reluctance between the sites of said bridging cores in either or both of the first and second stator pieces,
    placing stator windings about each bridging core,
    assembling the first and second stator pieces co-axially in facing relationship with each other and spaced axially apart by said bridging cores with said second stator piece oriented about the common axis such the claw poles of said second stator piece circumferentially alternate with the claw poles of said first stator piece;

each said winding or selected set of said windings constituting the windings for one of a plurality of motor phases such that in use when supplied with an exciting current produce flux flow through those stator claw poles in the first and second stator pieces which are proximate to the corresponding bridging core.

11. In a polyphase transverse flux dc motor including:

a rotor having a plurality of circumferentially disposed permanent magnets separated by segments of high permeability material to form rotor poles, a stator mounted co-axially with said rotor so as to provide an air gap therebetween, said stator having a plurality of circumferentially disposed and spaced apart poles, at least one stator winding per phase disposed such that when supplied with an exciting current produce flux flow through stator poles which are proximate thereto to produce a flux in said air gap adjacent to said poles, said windings in use being electronically commutated to produce a flux in said air gap which rotates about the stator axis, the improvement defined by the relationship wherein the number of motor phases (P) P, and f said P where N is an integer $\geq 2$; the number of windings per phase (W) W, and said W where M is an integer $\geq 1$; the number of poles associated with each winding (PW) PW, and said PW where L is an even integer $\geq 2$; and the number of stator poles (SP) is SP, and said SP is given by SP=(P)×(W)×(PW) and the number of rotor poles is SP+W.

* * * * *

UNITED STATES PATENT AND TRADEMARK OFFICE
CERTIFICATE OF CORRECTION

PATENT NO.    : 6,492,758 B1
DATED         : December 10, 2002
INVENTOR(S)   : Christian John Wade Gianni and John H. Boyd, Jr.

It is certified that error appears in the above-identified patent and that said Letters Patent is hereby corrected as shown below:

<u>Column 8,</u>
Line 24, "said magnetized" should read -- said magnets being magnetized --

<u>Column 10,</u>
Line 9, "P, and f said P" should read -- P, and said P --
Line 16, "SP+W." should read -- SP$\pm$W. --

Signed and Sealed this

Twenty-ninth Day of July, 2003

JAMES E. ROGAN
*Director of the United States Patent and Trademark Office*

UNITED STATES PATENT AND TRADEMARK OFFICE
CERTIFICATE OF CORRECTION

| | |
|---|---|
| PATENT NO. | : 6,492,758 B1 |
| APPLICATION NO. | : 09/704123 |
| DATED | : December 10, 2002 |
| INVENTOR(S) | : Christian John Wade Gianni and John H. Boyd, Jr. |

It is certified that error appears in the above-identified patent and that said Letters Patent is hereby corrected as shown below:

<u>Column 8.</u>

Line 43 please delete " (P) "
Line 44 please delete " , where N "
Line 45 please delete " (W) , "
Line 45 please delete " , where M"
Line 47 please delete " (PW) "
Line 47 please delete " , where L "
Line 48 please delete " (SP) "

<u>Column 10.</u>

Line 9 please delete " (P) P, and f said P where N" please insert -- is P and P --
Line 10-11 please delete " (W) W, and said W where M" please insert -- is W and W --
Lines 12-13 please delete "(PW) PW, and said PW where L" please insert -- is PW and PW --
Line 14 please delete "SP, and said SP"
Line 15 please delete " (P) x (W) x (PW) " please insert -- P*WP*PW --

Signed and Sealed this

Twenty-fifth Day of July, 2006

JON W. DUDAS
*Director of the United States Patent and Trademark Office*